US005146375A

United States Patent [19]

Satoh et al.

[11] Patent Number: 5,146,375

[45] Date of Patent: Sep. 8, 1992

[54] CARTRIDGE LOADING AND UNLOADING DEVICE FOR LOADING AND UNLOADING CARTRIDGE TO AND FROM INFORMATION PROCESSOR

[75] Inventors: Koichi Satoh; Shinichi Nakazato, both of Tokyo, Japan

[73] Assignee: NEC Corporation, Tokyo, Japan

[21] Appl. No.: 780,398

[22] Filed: Oct. 23, 1991

Related U.S. Application Data

[63] Continuation of Ser. No. 414,185, Sep. 28, 1989, abandoned.

[30] Foreign Application Priority Data

Sep. 30, 1988 [JP] Japan .......................... 63-128883[U]

[51] Int. Cl.[5] ...................... G11B 15/68; G11B 17/08

[52] U.S. Cl. .................................. 360/92; 360/98.04; 360/98.06; 369/178

[58] Field of Search .................... 360/92, 98.01, 98.04, 360/98.06, 91, 90, 99.06, 99.07, 85, 86; 369/34, 35, 36, 37, 38, 39, 178, 191

[56] References Cited

U.S. PATENT DOCUMENTS 4,742,405 5/1988 Teranishi .............................. 360/92

4,800,554 1/1989 Yamasaki et al. ................ 360/92 X 4,918,548 4/1990 O'Donnell et al. .................. 360/92

*Primary Examiner*—Andrew L. Sniezek

*Attorney, Agent, or Firm*—Sughrue, Mion, Zinn, Macpeak & Seas

[57] ABSTRACT

A cartridge handling device for loading and unloading a cartridge accommodating a magnetic tape, magnetic disk or similar recording medium from a processor which is operable with the cartridge. A support plate is reciprocatingly movable in the intended direction of movement of the cartridge toward the processor while extending perpendicularly to that direction. A pair of latch mechanisms are rotatable about individual latch shafts which are studded vertically on the support plate, in order to latch the cartridge when the cartridge is transported. A pair of one-way guide mechanisms are individually associated with the latch mechanisms for controlling the rotation of the latter.

9 Claims, 8 Drawing Sheets

CARTRIDGE LOADING AND UNLOADING DEVICE FOR LOADING AND UNLOADING CARTRIDGE TO AND FROM INFORMATION PROCESSOR

This is a continuation of application Ser. No. 07/414,185 filed Sep. 28, 1989 now abandoned.

BACKGROUND OF THE INVENTION

The present invention generally relates to a processing apparatus for reading or writing information in a magnetic tape, magnetic disk or similar recording medium which is accommodated in a cartridge and, more particularly, to a cartridge handling device for loading and unloading the catridge from the processing device.

In parallel with the extensive use of cartridges or cassettes each accommodating a recording medium therein, there have been proposed various types of devices for loading and unloading a cartridge or cassete from a processor. For example, U.S. Pat. No. 4,742,405 discloses a device of the type for storing and retrieving a cassette from a coder, player or similar processor.

It has been customary to operatively connect a cartridge or cassette handing device of the kind described to a drive source such as a rotary solenoid, motor or air cylinder so as to drive it directly by the output of the latter. More specifically, a prior art handling device has a drive source built in itself. This, coupled with the fact that the drive source is moved integrally with the handling device, brings about a drawback that the entire device has a bulky and heavy construction. Another problem is that wirings and tubings which are necessary for the drive of the device are congested in a complicated configuration, resulting in the device being complicated and the production cost being increased.

SUMMARY OF THE INVENTION

It is therefore an object of the present invention to provide a cartridge handling device which is small size, light weight, and simple in construction.

It is another object of the present invention to provide a cartridge handling device capable of surely loading and unloading a cartridge from a processor without resorting to a drive source.

It is another object of the present invention to provide a generally improved cartridge handling device.

In accordance with the present invention, there is provided a device for loading and unloading a cartridge to and from a processor which is operable with the cartridge when the cartridge is inserted into the processor. The cartridge is configured in a rectangular parallelepiped and provided with a pair of aligned recesses at opposite sides and adjacent to either one of a front end and a rear end of the cartridge with respect to an insertion direction of the cartridge into the processor. The device comprises a mounting member, and a support plate mounted on the mounting member and reciprocatingly movable in the insertion direction. The support plate comprises a push member for pushing the cartridge to move the same toward the processor. The device includes a pair of latch mechanisms each comprising a latch body rotatable about a latch shaft substantially at the center of the latch body, the latch shaft being studded on the support plate. The latch body comprises a hook rotatable about a hook shaft studded rigidly on one end of the latch body for latching the cartridge by engaging one end of the hook with one of the recesses of the cartridge. A one-way roller is provided on the other end of the latch body, and an abutment roller is provided on a portion of the latch body. The device further includes release means mounted on the mounting member and having a rigid surface for releasing engagement of the one ends of the hooks with the recesses of the cartridge, the rigid surface being engageable with the abutment roller of the latch body of the respective latch mechanism; a drive mechanism for reciprocatingly moving the support plate in the insertion direction; and a pair of one-way guide mechanisms each being associated with respect to a corresponding one of the latch mechanisms for controlling rotation of the corresponding latch mechanism. Each of the one-way guide mechanisms comprises a one-way guide body rotatable about a one-way shaft studded on the mounting member, the one-way guide body having a guide wall for guiding the one-way roller of the corresponding latch mechanism while the one-way roller is pressed against the guide wall.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
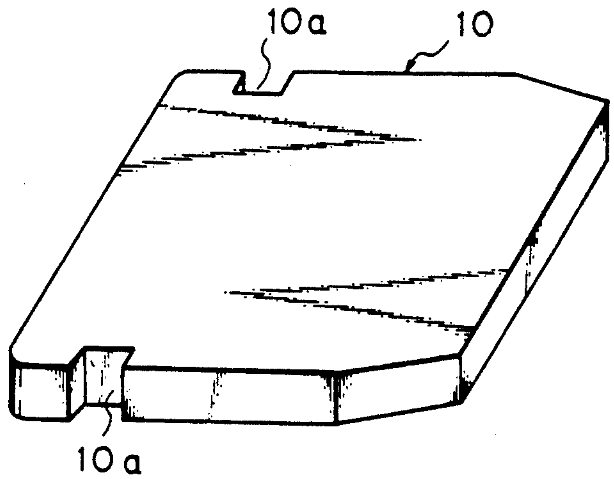
FIG. 1 is a perspective view of a cartridge applicable to a cartridge handling device of the present invention.

Referring to FIG. 1 of the drawings, a cartridge applicable to a cartridge handling device embodying the present invention is shown. The cartridge, generally 10, is generally configured in a rectangular parallelepiped and formed with recesses 10a at opposite sides thereof.

Figure 2:
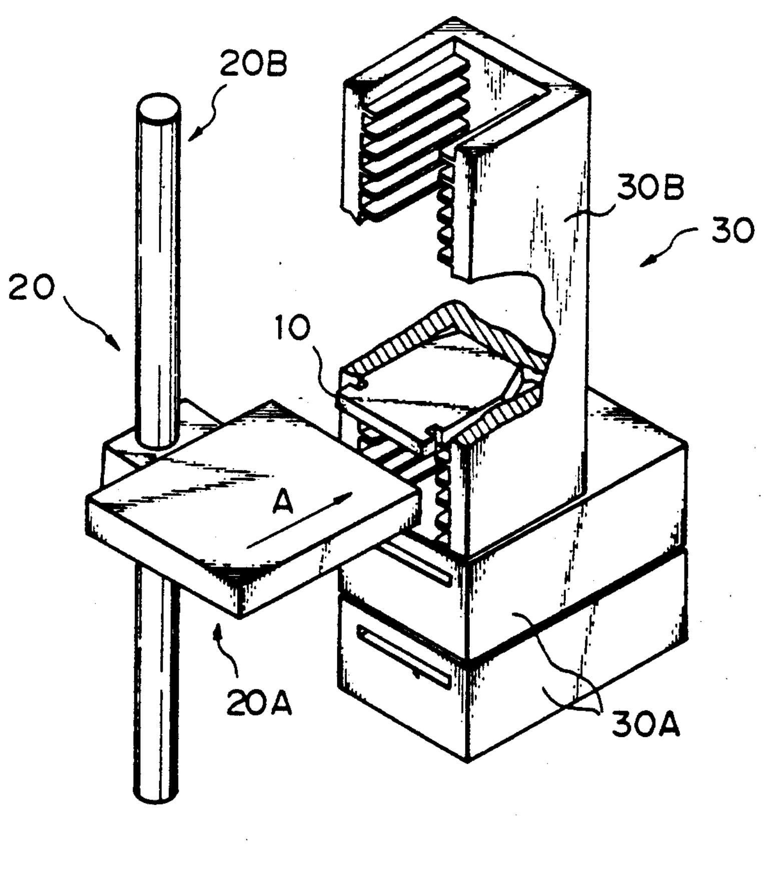
FIG. 2 is a perspective view showing the general construction of a cartridge handling device embodying the present invention together with a processor which is to be loaded and unloaded by the cartridge handling device.

FIG. 2 indicates the general construction of a cartridge handling device 20 of the illustrative embodiment together with a processor 30 which is operable with the cartridge 10. As shown, the processor 30 has a plurality of drive units, two drive units 30A in this example, for reading and writing data in the cartridge 10, and a case unit 30B capable of accommodating a plurality of cartridges 10 therein. The cartridge handling device 20 is generally comprised of a major mechanism section 20A for directly handling the cartridge 10 to load or unload it from the processor 30, and a guide mechanism 20B implemented as a linear guide for moving the mechanism section 20A up and down between the drive units 30A and the case unit 30B of the processor 30. The major mechanism section 20A of the device 20 is shown generally in FIGS. 3A and 3B, while an essential part thereof is shown in FIGS. 4A and 4B specifically.

Figure 3A:
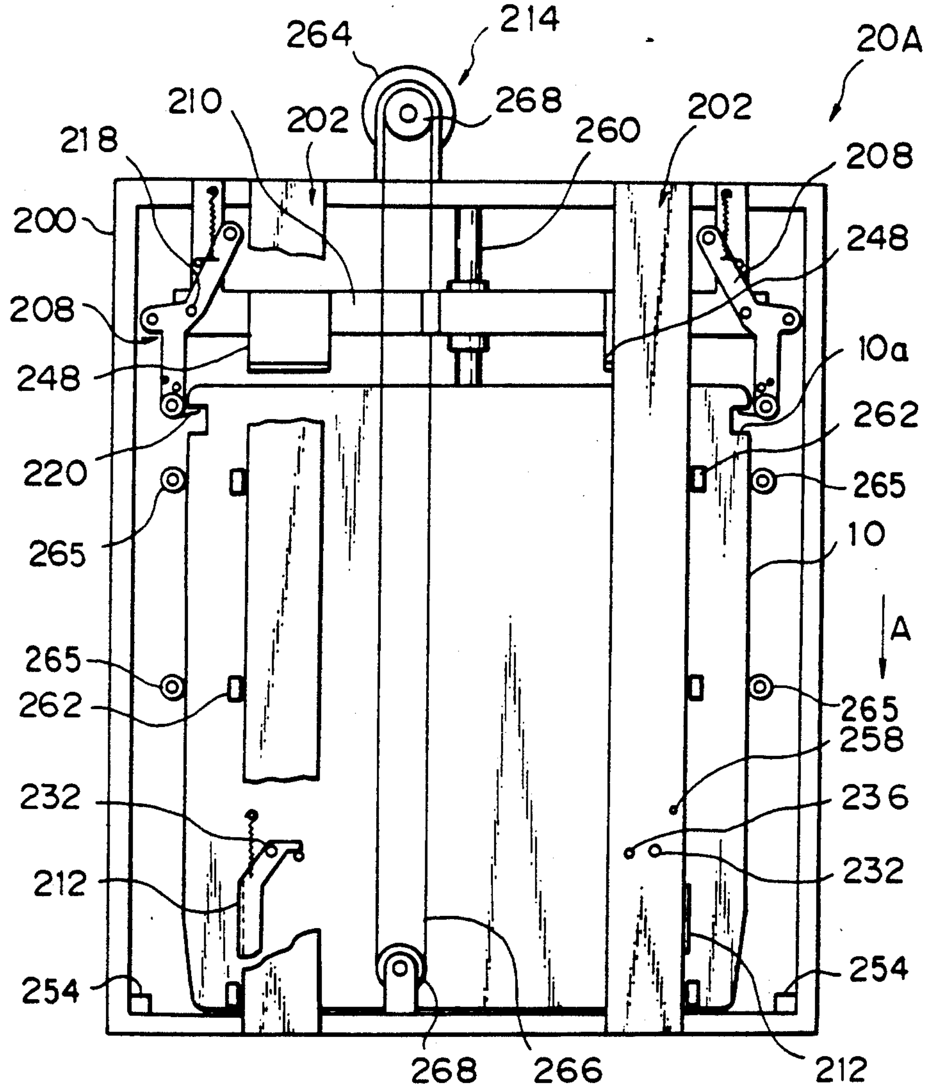
FIG. 3A is a plan view of a major mechanism section included in the illustrative embodiment.
Figure 3B:
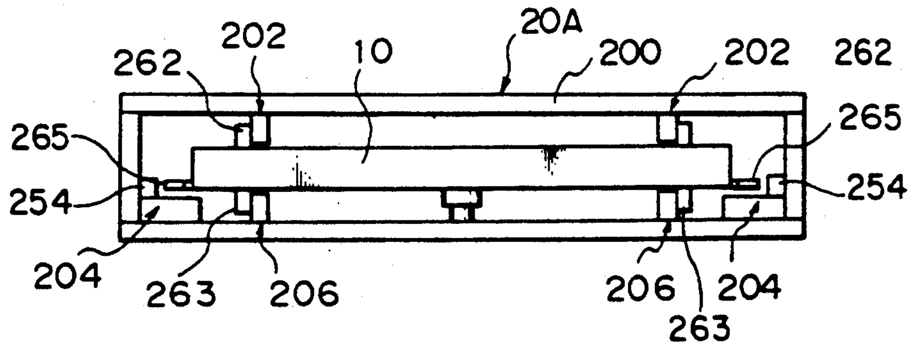
FIG. 3B is a front view of the arrangement shown in FIG. 3A.
Figure 4A:
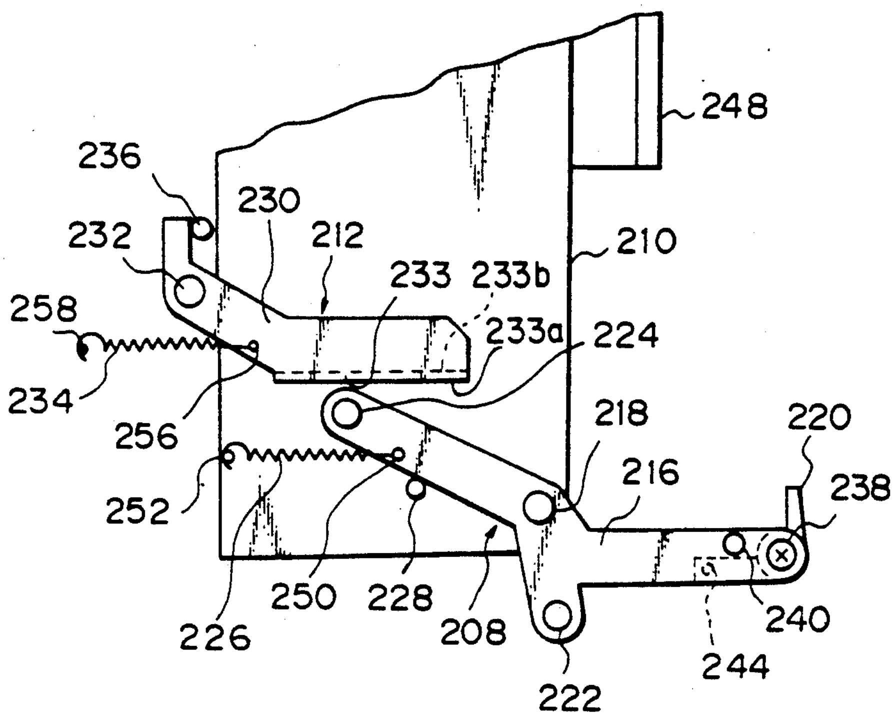
FIG. 4A is a fragmentary plan view of the arrangement of FIGS. 3A and 3B, showing a latch mechanism and a one-way guide mechanism in detail.
Figure 4B:
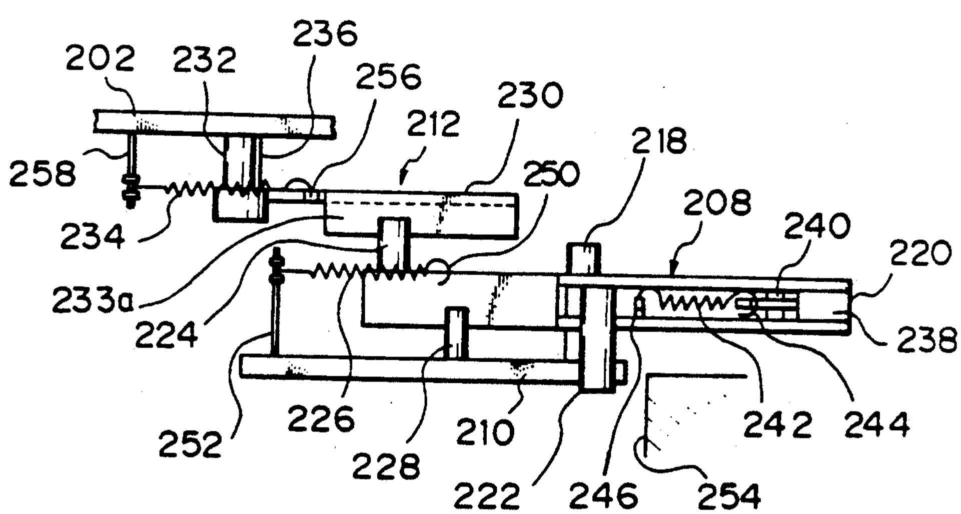
FIG. 4B is a side elevation associated with FIG. 4A.

As shown in FIGS. 3A and 3B, the major mechanism section 20A is made up of a frame 200, top plates 202, side plates 204 and base plates 206 which are mounted on the frame 200, a pair of latch mechanisms 208, a support plate 210 on which the latch mechanisms 208 are mounted, a pair of one-way guide mechanisms 212 individually mounted on the top plates 202, and a drive mechanism 214 mounted on the frame 200 and drivably connected to the support plate 210.

The latch mechanisms 208 and one-way guide mechanisms 212 will be described first. As shown in FIGS. 4A and 4B, each latch mechanism 208 has a latch body 216 which is rotatable about a latch shaft 218 that is studded on the support plate 210. A hook 220 is located at one end of the latch body 216. An abutment roller 222 is rigidly mounted on the latch body 216 for causing the latter to rotate clockwise about the latch shaft 218. A one-way guide roller 224 is mounted on the other end of the latch body 216 to maintain the latter in a predetermined angular position. A latch spring 226 constantly biases the latch body 216 counterclockwise about the latch shaft 218. A latch pin 228 is studded on the support plate 210 to stop the counterclockwise movement of the latch body 216 about the latch shaft 218. On the other hand, each one-way guide mechanism 212 has a one-way guide body 230 rotatable about a one-way shaft 232 which is studded on the top plate 202. The one-way guide body 230 includes a guide wall 233 with guide surfaces 233*a* and 233*b* for guiding the one-way roller 224 of the latch mechanism 208. A one-way spring 234 constantly biases the one-way guide body 230 clockwise about the one-way shaft 232. A one-way pin 236 is studded on the top plate 202 for stopping the clockwise movement of the one-way guide body 230 about the shaft pin 232. A hook 220 of the latch body 216 is rotatable relative to the latch body 216 about a hook shaft 238. A hook pin 240 is studded on the latch body 216 to restrict the clockwise movement of the hook 220 about the shaft 238. A hook spring 242 is retained at one end by an aperture 244 formed through the hook 220 and at the other end by a lug 246 which extends from the latch body 216. The spring 242, therefore, constantly biases the hook 220 clockwise about the shaft 238. A push member 248 is mounted on the support plate 210 to push the cartridge 10, as will be described.

The latch spring 226 is anchored at one end to an aperture 250 formed through the latch body 216 and at the other end to a plate pin 252 which is studded on the support plate 210. The latch spinrg 226, therefore, constantly biases the latch body 216 counterclockwise about the latch shaft 218. Rigidly mounted on the latch body 216, the abutment roller 222 causes the latch body 216 into clockwise movement about the latch shaft 218 when abutted against a rigid surface 254, FIG. 4B. Also rigidly mounted on the latch body 216, the one-way roller 224 is slidable on and along the guide surface 233*a* or 233*b* of the guide wall 233. The one-way spring 234 is anchored at one end to an aperture 256 formed through the one-way guide body 230 and at the other end to a top pin 258 which is studded on the top plate 202. In this configuration, the one-way spring 234 constantly biases the one-way guide body 230 clockwise about the one-way shaft 232.

Referring again to FIGS. 3A and 3B, the drive mechanism 214 for driving the support plate 210 has a linear guide 260 mounted on the frame 200 for guiding the support plate 210 which selectively moves the cartridge 10 toward the case unit 30B and drive untis 30A of the processor 30. Bearings 262 are mounted on each of the top plates 202 for guiding the cartridge 10 from above. A motor 264 drives the support plate 210 via a belt 266 which is passed over pulleys 268. The frame 200 has the rigid surfaces 254 with which the abutment rollers 222 rigidly mounted on the individual latches 208 are engageable. The top plates 202 extend parallel to each other in the intended direction of movement of the cartridge 10. The previously stated shaft 232, pin 236 and pin 258 studded on each top plate 202 extend vertically while facing each other. The support plate 210 extends perpendicularly to the top plates 202. Studded vertically on the support plate 210 are the shaft 218, pin 228, pin 252, and push member 248. Bearings 263 are mounted on each of the base plates 206 for guiding the cartridge 10 from below, while similar bearings 265 are mounted on each of the side plates 204 for guiding opposite sides of the cartridge 10. The base plates 206 and side plates 204 are mounted on the frame 200. In this configuration, the cartridge 10 is guided by the top plates 202, side plates 204, and base plates 206.

Figure 5A:
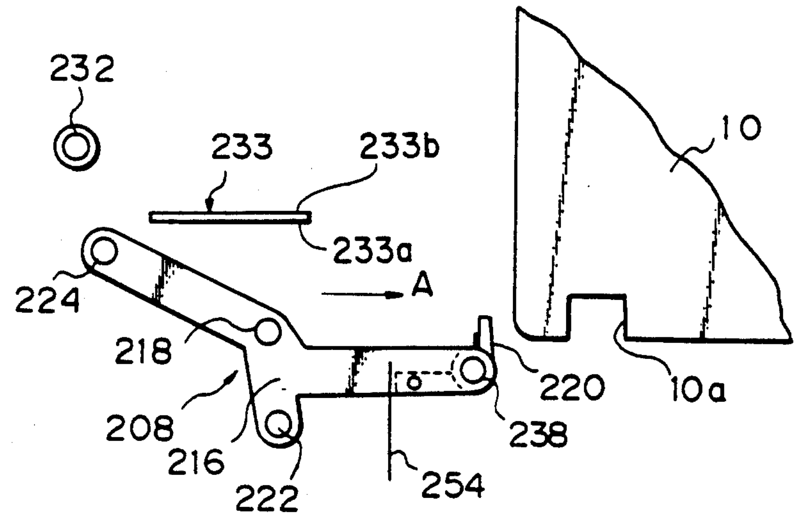
FIGS. 5A to 5E and 6A to 6G are views demonstrating the operations of the illustrative embodiment.
Figure 5B:
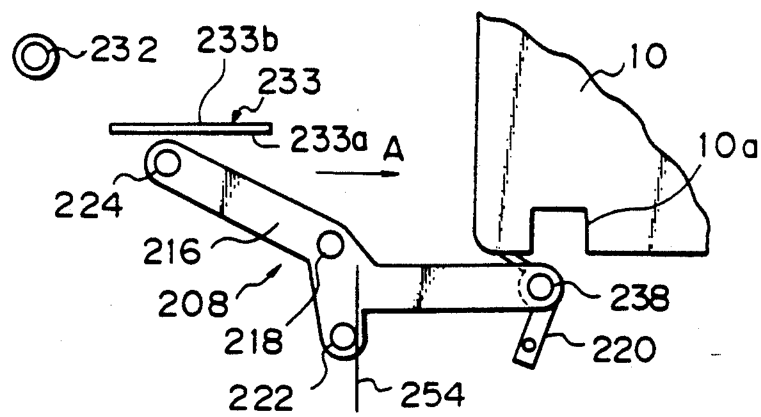
Figure 5C:
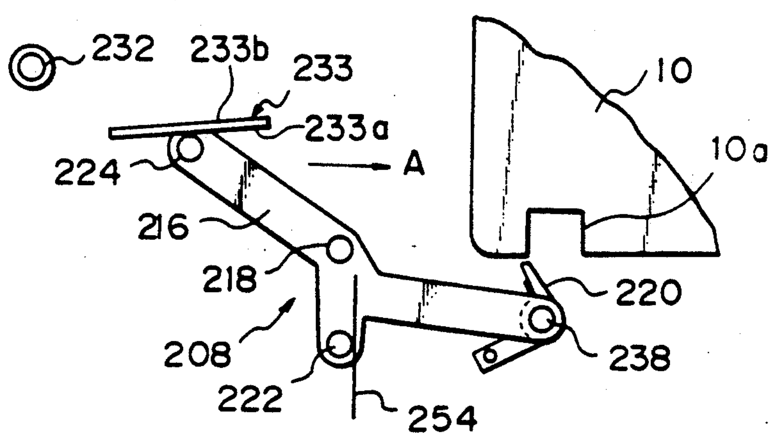
Figure 5D:
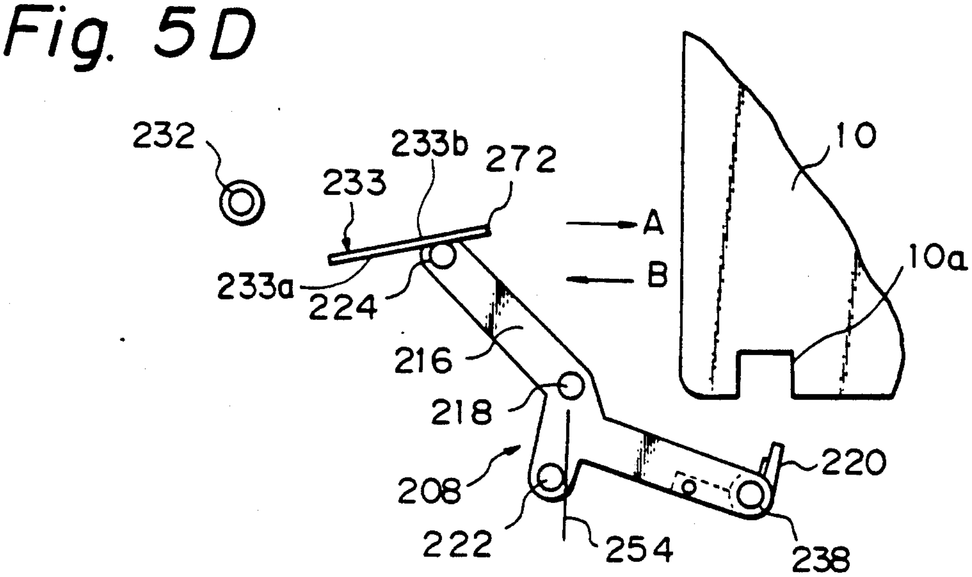
Figure 5E:
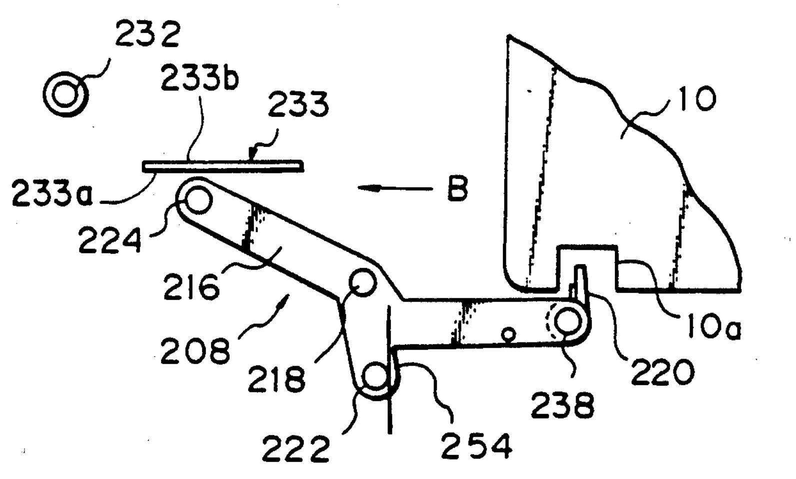
Figure 6A:
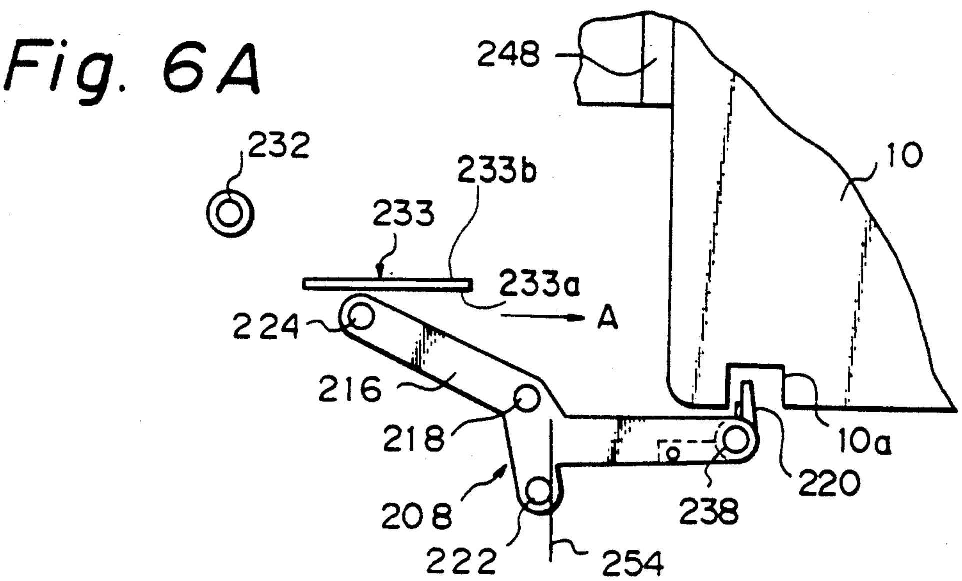

FIGS. 5A and 5E show a sequence of steps for moving the latch mechanisms 208 (only one is shown) toward the cartridge 10 so as to pick it out of the case unit 30B of the processor 30. FIGS. 6A and 6G show how the push members 248 (only one is shown) push the cartridge 10 out of the major mechanism section 20A of the cartridge handling device 20 with the hooks 220 (only one is shown) bekng sequentially released from the associated recesses 10*a* of the cartridge 10. In the figures, the components and structural elements which are not necessary for the understanding of the illustrative embodiment are not shown.

How the latch mechanism 208 pulls the cartride 10 out of the case unit 30B will described with referecence to FIGS. 5A to 5E. At this instant, the cartridge 10 does not exist in the major mechanism section 20A shown in FIG. 3A. The support plate 210 carrying the latch body 216 of the latch mechanism 208 therewith is moved by the motor 264, i.e., the belt 266 and the linear guide 260 in a direction indicated by an arrow A, approaching the case unit 30B which is loaded with the cartridge 20 as shwon in FIG. 2. As previously stated, the latch body 216 is rotatable about the latch shaft 218 which is studded on the support plate 210, while the latch spring 226 which is a tension spring constantly biases the latch body 216 counterclockwise. The latch pin 228 prevents the latch body 216 from rotating counterclockwise beyond the position shown in FIG. 4A. Hence, the latch body 216 is stably held in the position shown in FIG. 4 by the spring 226 and pin 228, so long as no external force acts on the latch body 216.

As the support plate 210 is driven in the direction A as stated above, the latch body 216 approaches the cartridge 10 and one-way guide mechanism 212, as shown in FIG. 5A. At this stage of movement, the latch body 216 is free from external forces and, therefore, it remains stable without being rotated. The hook 220 is constantly biased clockwise by the hook spring 242 which is also a tension spring, while the hook pin 240 studded on the latch body 216 restricts the movement of the hook 220. Therefore, the hook 220 also remains stable in the position shown in FIG. 4A due to the spring 242 and pin 240, so long as no external force acts thereon.

As shown in FIG. 5B, as the latch mechanism 208 is further moved in the direction A form the position of FIG. 5A, the hook 220 is brought into contact with the cartridge 10 and thereby subjected to an external force. Consequently, the hook 220 is rotated counterclockwise about the pin hook shaft 238 by the cartridge 10. Here, the force of the spring 226 associated with the latch body 216 is selected to be greater than the force of the spring 242 associated with the hook 220. The latch body 216, therefore, remains in the position shown in FIG. 5B without being rotated. In the position shown in FIG. 5B, the abutment roller 222 begins to make contact with the rigid surface 254. The one-way roller 224 is spaced apart from the guide surface 233*a* of the guide wall 233, so that no external force is applied to the one-way guide mechanism 212. Hence, the one-way guide body 230 remains stable in contact with the one-way pin 236, as shown in FIG. 4A.

As shown in FIG. 5C, when the latch mechanism 208 is moved in the direction A beyond the position of FIG. 5B, the abutment roller 222 is urged against the rigid surface 254. As a result, an external force acts on the latch body 216 to rotate the latter clockwise about the latch shaft 218. The latch body 216 in turn causes the one-way roller 224 into contact with the guide surface 233*a* of the guide wall 233 of the one-way guide mechanism 212, whereby the one-way guide mechanism 212 is rotated counterclockwise about the one-way shaft 232.

After the latch mechanism 208 has been further moved in the direction A from the position of FIG. 5C, it is brought to stop for a moment, as shown in FIG. 5D. In this position, the abutment roller 222 remains in abutment against the rigid surface 254, while the latch body 216 reaches the maximum angle of rotation due to the surface 254. Nevertheless, the point of contact of the one-way roller 224 and guide surface 233*a* of the guide wall 233 does not exceed the rightmost end 272 of the guide wall 233. As soon as the latch body 216 reachs such a position, the hook 220 is released from the cartridge 10 and maintained stable in contact with the hook pin 240, FIG. 4A.

When the latch mechanism 208 having been stopped in the position of FIG. 5D is driven in a direction B which is opposite to the direction A, the angle of rotation of the latch body 216 defined by the surface 254 is sequentially reduced, as shown in FIG. 5E. The hook 220, therefore, enters the recess 10*a* of the cartridge 10 in due course. As the latch mechanism 208 is further removed in the direction B beyond the position of FIG. 5E, it pulls the cartridge 10 into the major mechanism section 20A until the cartridge 10 has been fully received therein, as shown in FIGS. 3A and 3B. Needless to mention, the hook 220 will cooperate with the other hook 200 in so pulling the cartridge 10 into the major mechanism section 20A.

How the cartridge 10 is pulled out of the major mechanism section 20A and then loaded in the case unit 30B of the processor 30 is as follows. FIG. 6A indicates a condition wherein the cartridge 10 is being moved out of the major mechanism section 20A toward the case unit 30B. In this condition, the hook 220 is still engaged in the recess 10*a* of the cartridge 10.

Figure 6B:
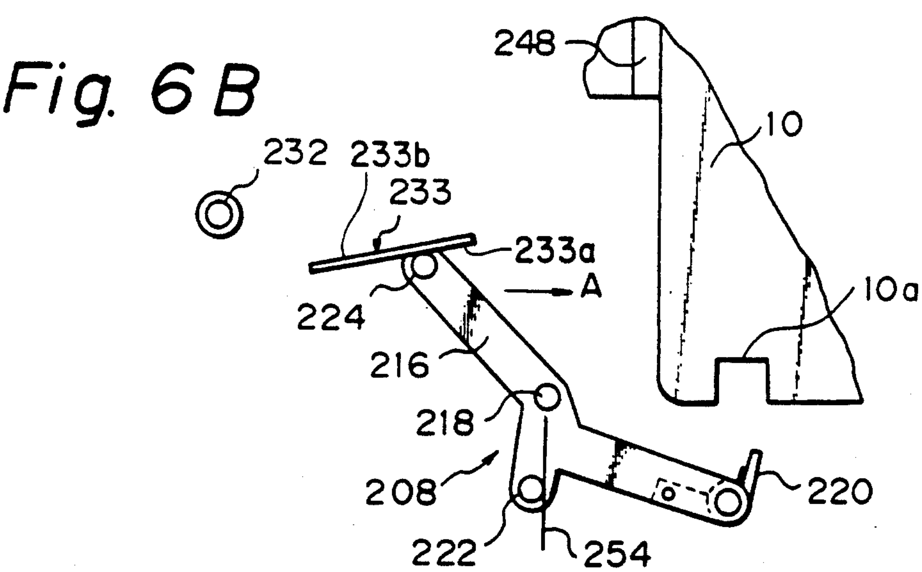

As the latch mechanism 208 and push member 248 are further moved in the direction A from the position of FIG. 6A so as to urge the cartridge 10 into the case unit 30B, the abutment roller 222 abuts against the rigid surface 254, as shown in FIG. 6B. This cuases the latch body 216 to rotate clockwise about the latch shaft 218, as also shown in FIG. 6B. Consequently, the hook 220 is released from the recess 10*a* of the cartridge 10, while the one-way roller 224 is pressed against the guide surface 233*a* of the guide wall 233 to in turn rotate the one-way guide mechanism 212 counterclockwise.

Figure 6C:
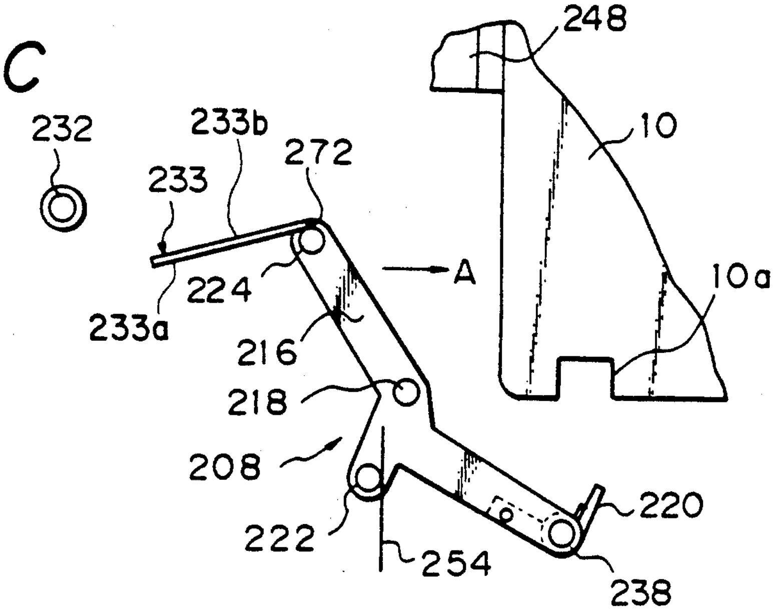

As shown in FIG. 6C, when the latch mechanism 208 is moved in the direction A beyond the position of FIG. 6B, the push member 248 moves the cartridge 10 futher in the direction A, i.e., toward the case unit 30B. As the abutment roller 222 is urged agaisnt the surface 254, the angle of rotation of the latch member 216 is further increased with the result that the contact point of the one-way roller 224 and guide surface 233*a* of the guide wall 233 reaches the rightmost end 272 of the guide wall 233.

Figure 6D:
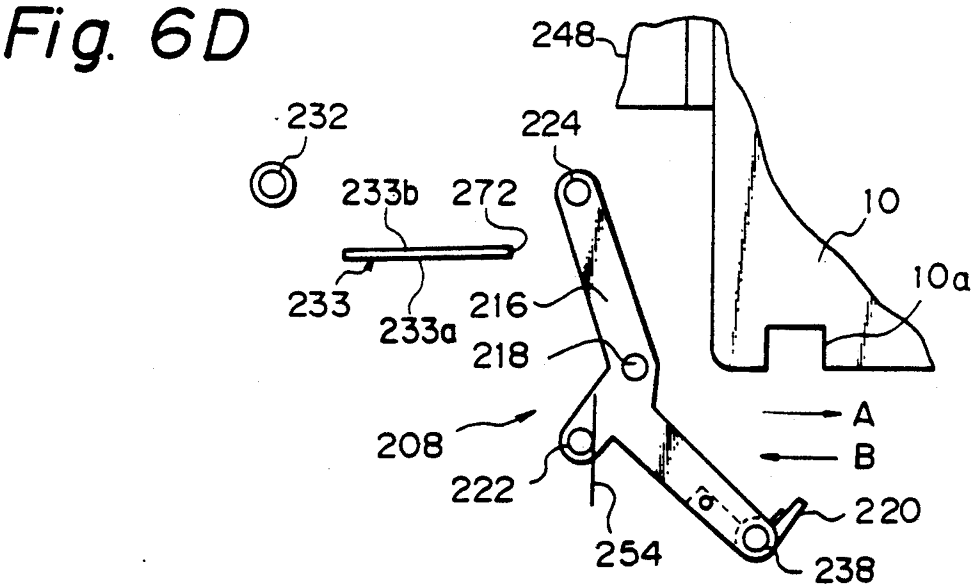

FIG. 6D shows the latch mechanism 208 having been moved in the direction A from the position of FIG. 6C and then brought to a temporary stop. In FIG. 6D, the push member 248 so located as to be capable of loading the cartridge 10 in the case unit 30B is further moved toward the case unit 30B beyond the position of FIG. 6C, whereby the cartridge 10 is fully received in the case unit 30B. Due to the further movement of the latch mechanism 208 in the direction A, the abutment roller 222 is further pressed against the surface 254 to in turn make the angle of rotation of the latch body 216 greater. As a result, the one-way roller 224 slips off the rightmost end 272 of the guide wall 233. Then, the one-way guide mechanism 212 is rotated clockwise by the action of the spring 234 until it abuts against the one-way pin 236, as shown in FIG. 4A.

Subsequently, the latch mechansim 208 having been stopped as stated above is moved together with the push member 248 in the direction B to a position shown in FIG. 6E. In this position, the angle of rotation of the latch body 216 ascribable to the abutment of the roller 222 against the surface 254 is sequentially reduced, so that the latch body 216 is rotated counterclockwise until the roller 224 contacts another guide surface 233*b* of the guide wall 233. An arrangement is made such that while the latch body 216 is in the angular position shown in FIG. 6E with the one-way roller 224 abutting agianst the guide surface 233*b* of the guide wall 233, the hook 220 does not contact the cartridge 10. The push member 248 which simply functions to urge the cartridge 10 in the direction A is moved away from the cartridge 10 by the exactly same distance as the movement thereof in the direction B.

Figure 6E:
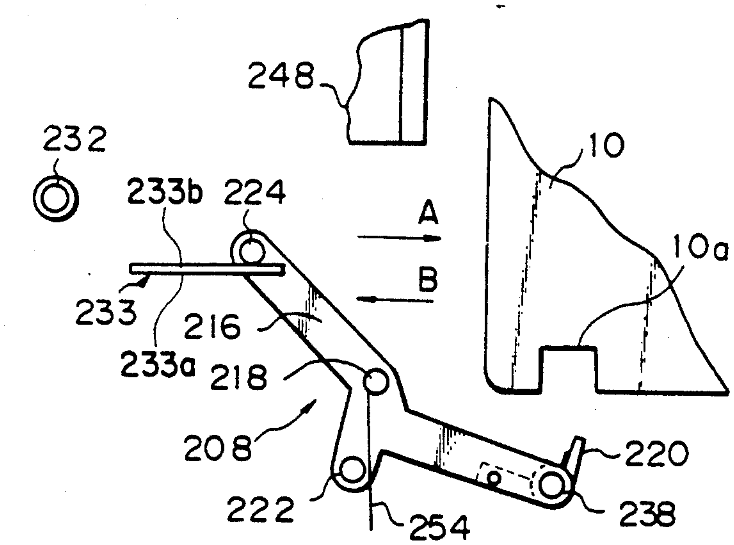
Figure 6F:
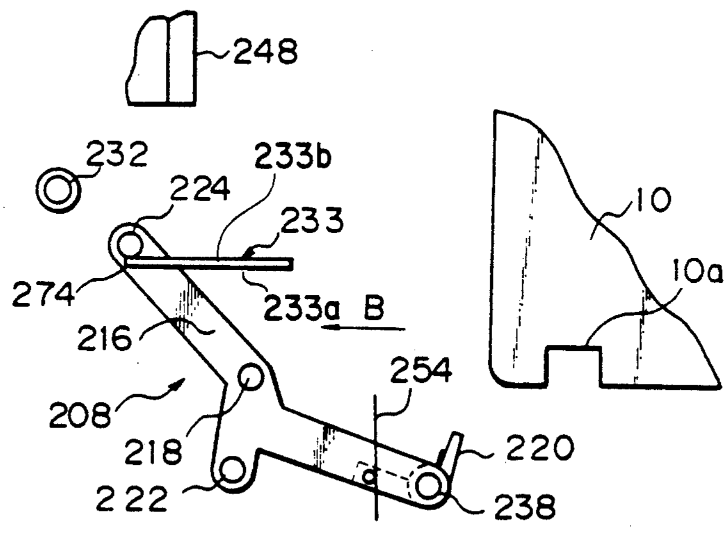
Figure 6G:
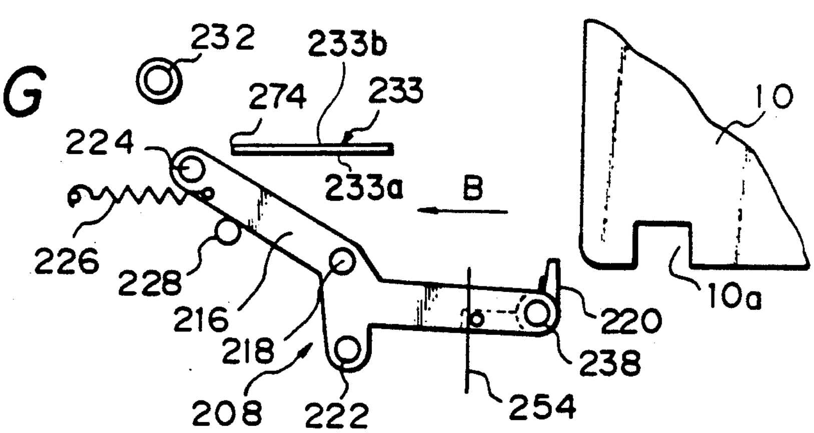

As shown in FIG. 6F, while the latch mechanism 208 and push member 248 are further moved in the direction B from the position of FIG. 6E, the one-way roller 224 slides on and along the guide surface 233*b* of the guide wall 233 to thereby restrict the rotation of the latch body 216. More specifically, the latch body 216 is held in an angular position which prevents the hook 220 from contacting the cartridge 10. Sliding on the guide surface 233*b* of the guide wall 233, the one-way roller 224 reaches the leftmost end 274 of the guide wall 233.

When the latch mechanism 208 is moved in the direction B from the position shown in FIG. 6F, the one-way roller 224 slips off the leftmost edge 274 of the guide wall 233 and is thereby released from the restriction of the guide wall 233. Consequently, the latch body 216 is restored to its original angular position where it contacts the latch pin 228, by the action of the spring 226. It is to be noted that the hook 220 is so located as not to contact the cartridge 10 when the latch body 216 regains the original position. Thereafter, the latch mechanism 208 is further moved in the direction B to a predetermined waiting position where it will become ready to pull the cartridge 10 out of the case unit 30B.

In summary, it will be seen that the present invention provides a cartridge handling device which is capable of handling a cartridge without the need for a rotary solenoid, motor, air cylinder or similar special drive source and is therefore small size, light weight, and inexpensive. This unprecedented advantage is derived from latch mechanisms mounted on a reciprocating support plate, and one-way guides which maintain the angle of rotation of their associated latch mechanisms constant.

Various modifications will become possible for those skilled in the art after receiving the teachings of the present disclosure without departing from the scope thereof.

What is claimed is:

1. A device for loading and unloading a cartridge to and from a processor which is operable with said cartridge when said cartridge is inserted into said processor, said cartridge being configured in a rectangular parallelepiped and provided with a pair of aligned recesses at opposite sides and adjacent to either one of a front end and a rear end of said cartridge with respect to an insertion direction of said cartridge into the processor, said device comprising:

a mounting member;

a support plate mounted on said mounting member and reciprocatingly movable in said insertion direction, said support plate comprising a push member for pushing said cartridge to move the same toward said processor;

a pair of latch mechanisms each comprising a latch body rotatable about a latch shaft substantially at the center of said latch body, said latch shaft being studded on said support plate, said latch body comprising a hook rotatable about a hook shaft studded rigidly on one end of said latch body for latching said cartridge by engaging one end of said hook with one of said recesses of said cartridge, a guide roller provided on the other end of said latch body, and an abutment roller provided on a protion of said latch body, in which each of said latch mechanisms further comprises a latch spring for constantly biasing said respective latch body such that said respective latch body is rotated about said respective latch shaft in an engagement direction of said respective hook into one of said recesses of said cartridge;

release means mounted on said mounting member and having a rigid surface for releasing engagement of said one ends of said hooks with said recesses of said cartridge when said cartridge is being loaded into said processor, said rigid surface being engageable with said abutment roller of said latch body of the respective latch mechanism;

a drive mechanism for reciprocatingly moving said support plate in said insertion direction; and a pair of guide mechanisms each being associated with respect to a corresponding one of said latch mechanisms for controlling rotation of said corresponding latch mechanism, each of said guide mechanisms comprising a guide body rotatable about a shaft studded on said mounting member, said guide body having a guide wall for guiding said guide roller of said corresponding latch mechanism while said guide roller is pressed against said guide wall of said guide body;

whereby during loading of said cartridge into said processor, each of said latch mechanisms and said push member move from an initial position toward said processor so as to urge the cartridge into said processor, while said abutment rollers abut against a corresponding said rigid surface so as to rotate each of said latch bodies a predetermined angle in a direction to thereby release each of said hooks from said recesses of said cartridge, and further when each of said latch mechanisms and said push member move away from said processor toward said initial position, each of said guide rollers is pressed against a corresponding guide wall to thereby prevent each of said hooks from contacting said cartridge; and whereby during unloading of said cartridge from said processor, when each of said latch mechanisms is carried by said support plate away from said processor, each of said latch bodies is rotated by a corresponding said latch spring so that said hooks enter said recesses of said cartridge and said cartridge is thereby pulled from said processor.

2. A device as claimed in claim 1, in which said mounting member comprises a frame, and a pair of top plates, a pair of base plates and a pair of side plates which are mounted on said frame and extend parallel to each other in said insertion direction.

3. A device as claimed in claim 2, in which each of said top, base and side plates is provided with bearings for guiding said cartridge in said insertion direction.

4. A device as claimed in claim 1, in which said support plate extends perpendicular to said insertion direction.

5. A device as claimed in claim 1, in which said support plate further comprises a latch pin for stopping rotation of said respective latch body caused by said respective latch spring.

6. A device as claimed in claim 1, in which each of said guide mechanisms further comprises a spring for biasing said respective guide body such that said respective guide roller is pressed against said guide wall of said respective guide body.

7. A device as claimed in claim 6, in which said mounting member comprises a pin for stopping rotation of said respective guide body caused by said respective spring.

8. A device as claimed in claim 1, in which each of said latch bodies further comprises a hook spring for biasing said respective hook such that said respective hook is rotated about said respective hook shaft to maintain engagement of said one end of said respective hook with said one of said recesses of said cartridge.

9. A device as claimed in claim 8, in which each of said latch bodies further comprises a hook pin for restricting rotation of said respective hook by said respective hook spring.

* * * * *

UNITED STATES PATENT AND TRADEMARK OFFICE
CERTIFICATE OF CORRECTION

PATENT NO. : 5,146,375
DATED : September 8, 1992
INVENTOR(S) : Koichi Satoh et al.

It is certified that error appears in the above-identified patent and that said Letters Patent is hereby corrected as shown below:

Col. 1, line 16, delete "catridge" and insert --cartridge--.

Col. 3, line 52, delete "spinrg" and insert --spring--.

Col. 4, line 32, delete "bekng" and insert --being--.

Col. 4, line 37, delete "cartride" and insert --cartridge--.

Col. 4, line 38, delete "referecence" and insert --reference--.

Col. 4, line 46, delete "shwon" and insert --shown--.

Col. 5, line 67, delete "cuases" and insert --causes--.

Signed and Sealed this

Twelfth Day of October, 1993

*Attest:*

Bruce Lehman

BRUCE LEHMAN

*Attesting Officer* *Commissioner of Patents and Trademarks*